United States Patent
Ng et al.

(10) Patent No.: US 9,354,880 B2
(45) Date of Patent: May 31, 2016

(54) PROCESSING DEVICE FOR HIGH-SPEED EXECUTION OF AN XRISC COMPUTER PROGRAM

(71) Applicant: The United States of America as represented by the Administrator of the National Aeronautics and Space Administration, Washington, DC (US)

(72) Inventors: Tak-Kwong Ng, Yorktown, VA (US); Carl S. Mills, Williamsburg, VA (US)

(73) Assignee: THE UNITED STATES OF AMERICA AS REPRESENTED BY THE ADMINISTRATOR OF THE NATIONAL AERONAUTICS AND SPACE ADMINISTRATION, Washington, DC (US)

( * ) Notice: Subject to any disclaimer, the term of this patent is extended or adjusted under 35 U.S.C. 154(b) by 580 days.

(21) Appl. No.: 13/792,489

(22) Filed: Mar. 11, 2013

(65) Prior Publication Data
US 2015/0254075 A1    Sep. 10, 2015

Related U.S. Application Data

(60) Provisional application No. 61/639,138, filed on Apr. 27, 2012.

(51) Int. Cl.
| G06F 9/30 | (2006.01) |
| G06F 9/445 | (2006.01) |
| G06T 1/20 | (2006.01) |

(52) U.S. Cl.
CPC .............. G06F 9/3012 (2013.01); G06F 9/445 (2013.01); G06T 1/20 (2013.01)

(58) Field of Classification Search
None
See application file for complete search history.

(56) References Cited

U.S. PATENT DOCUMENTS

| 3,969,722 | A | * | 7/1976 | Danco | ..................... | G05B 19/05 700/83 |
| 5,206,940 | A | * | 4/1993 | Murakami | .............. | G06F 7/575 711/200 |
| 5,414,866 | A | * | 5/1995 | Ohmae | ............... | G06F 15/7814 712/33 |
| 6,519,695 | B1 | * | 2/2003 | Kostic | ..................... | H04L 29/06 712/220 |
| 2009/0031104 | A1 | * | 1/2009 | Vorbach | .............. | G06F 9/30014 712/18 |
| 2012/0033851 | A1 | * | 2/2012 | Chen | ..................... | G06T 7/0002 382/100 |

OTHER PUBLICATIONS

Robert Hodson, et al., "Lidar Image Processing Acceleration via FPGA Implementation," ReSpace/MAPLD 2010 Conference, Nov. 1-4, 2010, pp. 1-20, Albuquerque, NM.

* cited by examiner

*Primary Examiner* — William B Partridge
(74) *Attorney, Agent, or Firm* — Andrea Z. Warmbier

(57) ABSTRACT

A processing device for high-speed execution of a computer program is provided. A memory module may store one or more computer programs. A sequencer may select one of the computer programs and controls execution of the selected program. A register module may store intermediate values associated with a current calculation set, a set of output values associated with a previous calculation set, and a set of input values associated with a subsequent calculation set. An external interface may receive the set of input values from a computing device and provides the set of output values to the computing device. A computation interface may provide a set of operands for computation during processing of the current calculation set. The set of input values are loaded into the register and the set of output values are unloaded from the register in parallel with processing of the current calculation set.

20 Claims, 6 Drawing Sheets

PROCESSING DEVICE FOR HIGH-SPEED EXECUTION OF AN XRISC COMPUTER PROGRAM

CROSS-REFERENCE TO RELATED PATENT APPLICATION

This application is a nonprovisional of, and claims the benefit of and priority to, U.S. Provisional Patent Application No. 61/639,138, filed on Apr. 27, 2012, the contents of which are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes.

TECHNICAL FIELD

Aspects of the invention generally relate to computer processing and in particular relate to computer processing devices for executing a computer program.

BACKGROUND OF THE INVENTION

Image processing algorithms are computationally intensive. In this regard, many real-time image processing methods often require robust processors and memory resources. Real-time or near real-time image processing systems may be required in a closed-loop control environment, such as autonomous landing and hazard avoidance. For astronomical applications, it is advantageous to minimize power, mass, and volume. Accordingly, a space-borne high-performance computing platform having a small foot-print that processes images in real time and consumes minimal power is desirable. Development of image processing algorithms to meet these specifications continues. Algorithm development is an iterative process, and a short build and test time may help to reduce algorithm development, customization, and qualification.

Space-borne environments may limit options for high-performance computing components that can be operated with acceptable reliability. Physical parameters such as mass, volume, and power, for example, may be constrained. Computing performance and physical parameters are often conflicting constraints. Image processing algorithms can be complex, and complexity may increase the hardware necessary to implement the algorithm. The power consumption, the mass, and/or the volume of the implementation may depend on the amount and type of hardware utilized. Although pixel-based image processing algorithm can be parallelized, multiple copies of hardware may be necessary to achieve real-time or near real-time image processing. Unfortunately, multiple copies of hardware may drive up the power consumption, the mass, and the volume of the implementation.

Moreover, even though image processing algorithms can be prototyped, executed, and modified on general purpose computing systems, this approach may not be sufficient for development and implementation of space-borne image processing algorithms. First, the net performance of a general purpose computing system may not achieve real-time image processing desired for space-borne applications. Second, general purpose computer systems are often complex having a relatively large physical foot print in terms of power, mass, and volume. For space-borne applications, minimizing the physical foot print is desirable. Direct implementation of image processing algorithms on digital circuits may reduce execution time to achieve real-time or near real-time image processing. Commercially available software tools may be employed to develop and implement image processing algorithms using digital circuits. This approach, however, may also not be sufficient for development and implementation of space-borne image processing algorithms. Even utilizing the software tools, translation effort is often non-trivial thereby making it relatively difficult to quickly prototype, test, and modify image processing algorithms under development. Second, the implementation that results may be relatively complex, requiring multiple field-programmable gate arrays (FPGA) or application-specific integrated circuit (ASIC) devices. Accordingly, this approach may result in implementations also having a relatively large physical footprint in terms of power, mass, and volume.

Processor-based implementations as opposed to direct implementations in logic circuits may have higher execution times and may not achieve real-time or near real-time image processing desired for space-borne applications. Prior solutions have not resolved the need for an approach to real-time image processing that is suited for space-borne applications and that can accommodate relatively quick implementation, testing, and modification of image-processing algorithms during development. Therefore, there is a need for systems and methods that address one or more of the deficiencies described above.

BRIEF SUMMARY OF THE INVENTION

The following presents a general summary of aspects of this invention in order to provide a basic understanding of at least some aspects of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects relate to a processing device for high-speed execution of a computer program. In certain embodiments, the processing device may be configured to process a plurality of different algorithms relating to image processing. The device may include a memory module configured to store one or more computer programs (computer-executable instructions). A sequencer may select one of the computer programs and control execution of the selected program. A register module may store intermediate values associated with a current calculation set, a set of output values associated with a previous calculation set, and/or a set of input values associated with a subsequent calculation set. An external interface may receive the set of input values from a computing device and provide the set of output values to the computing device. A computation interface may provide a set of operands for computation during processing of the current calculation set. The set of input values are loaded into the register and the set of output values may be unloaded from the register in parallel with processing of the current calculation set.

Further aspects relate to methods for high-speed execution of a computer program is also provided. In certain embodiments, a computer program may be selected at a processing device for execution. The computer-program may be one of a plurality of algorithms configured to process image data. A computation device attached to the processing element may process a current calculation set. A set of input values associated with a subsequent calculation set may be loaded into a register module, and a set of output values associated with a previous calculation set may be unload from the register module. Processing the current calculation set, loading the set of input values, and unloading the set of output values are performed in parallel in accordance with certain embodiments.

An apparatus for high-speed execution of an image-processing algorithm is further provided. A memory module may store the image-processing algorithm and a sequencer may control execution of the image-processing algorithm. A register module may store intermediate values associated with a current set of image-processing calculations as well as a set of image-processing outputs associated with a previous set of image-processing calculations and a set of image-processing inputs associated with a subsequent set of image-processing calculations. An external interface may receive the set of image-processing inputs from a light detection and ranging (LIDAR) system and provide the set of image-processing outputs to the LIDAR system. The register module loads the set of image-processing inputs and unloads the set of image-processing outputs in parallel with processing the current set of image-processing calculations at the processor.

DETAILED DESCRIPTION OF THE INVENTION

In the following description of various examples of the invention, reference is made to the accompanying drawings which show, by way of illustration, various example systems and environments in which aspects of the present disclosure may be practiced. It is to be understood that other specific arrangements of parts, example systems, and environments may be utilized and structural and functional modifications may be made without departing from the scope of these disclosures.

In addition, the present disclosure is described in connection with one or more embodiments. The descriptions set forth below, however, are not intended to be limited only to the embodiments described. To the contrary, it will be appreciated that there are numerous equivalents and variations that may be selectively employed that are consistent with and encompassed by the disclosures below.

Figure 1:
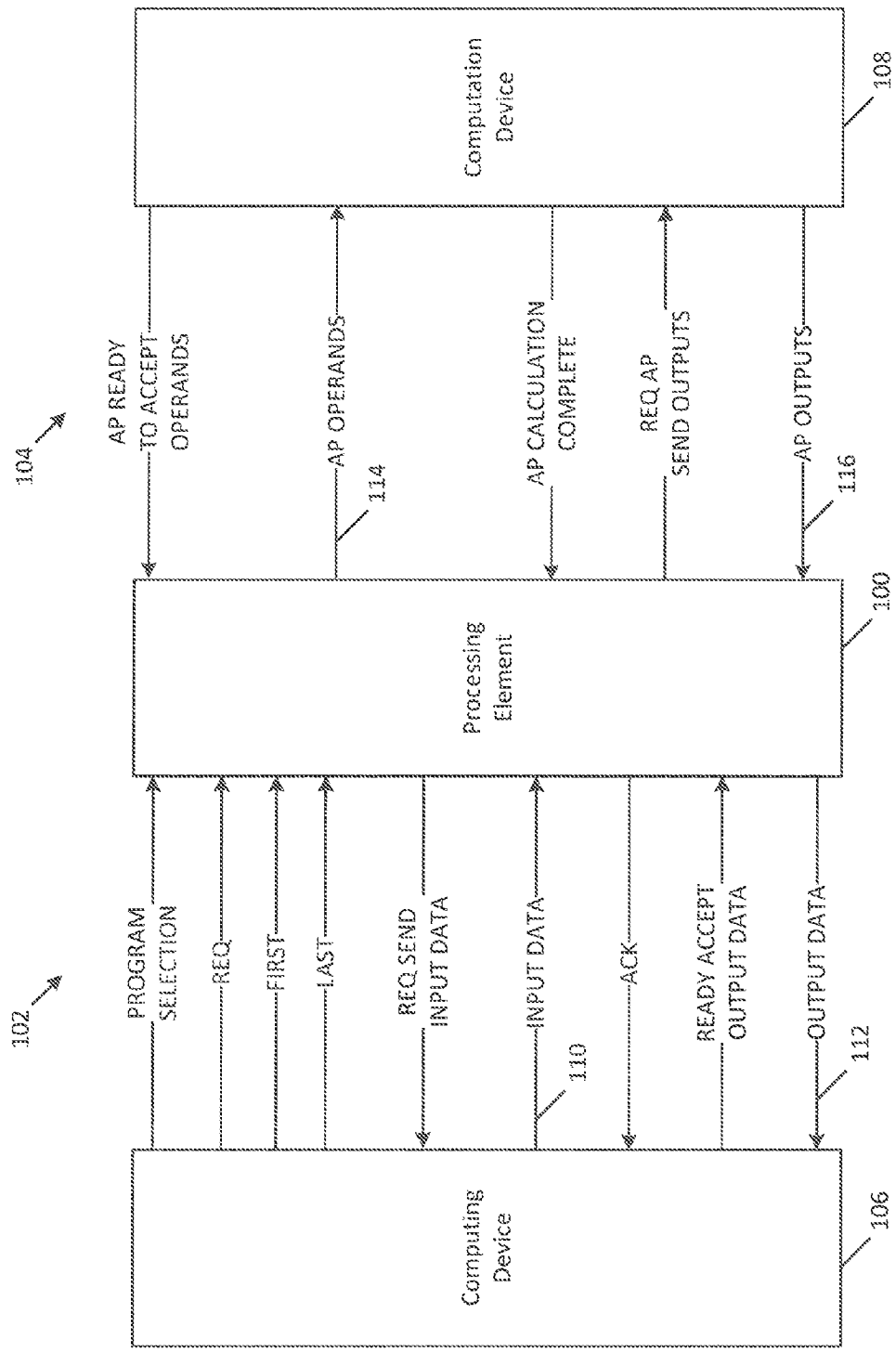
FIG. 1 is a block diagram of an example implementation of a processing element in accordance with one embodiment of the invention.

Referring to FIG. 1, an example implementation of a processing device 100 is shown. The processing device 100 may also be referred to as a processing element. The processing device 100 may include a plurality of interfaces, such as for example, an external interface 102 and a computation interface 104. The external interface 102 of the processing element 100 may be configured to interface with a computing device 106 that is external relative to the processing element. The external interface 102 is shown as being configured to: a) receive inputs to the processing element 100 from an external computing device (e.g., computing device 106); and b) provide outputs from the processing element 100 to the computing device 106. The computation interface 104 may be configured to interface with a computation device 108 that is attached to the processing element 100. Accordingly, the computation interface 108 includes operands provided to the computation device and outputs received from the computation device. The computation device 108 may be, for example, a processor. In certain embodiments, computation device 108 may support a plurality of processing units, such as processing unit 100. As discussed below, the computation device 108 may receive computations that pass a threshold of complexity and/or usage off-loaded from the processing element 100. For example, for computer-executable instructions relating to image processing, in-line memory access and/or tri-geometry functions may be off-loaded to the computation device 108. It will be appreciated that the computation device may be, for example, an arithmetic-logic unit (ALU), a processor, and the like. It will also be appreciated that processing element 100 may interface with multiple computation devices that include an ALU, a processor, and combinations thereof. The computation device will be discussed in further detail below.

In accordance with one implementation, various control signals are exchanged between the external computing device 106 and the processing element 100 as well as between the computation device 108 and the processing element. Various data busses may exchange data between the computing device 106 and the processing element 100 as well as between the processing element 100 and the computation device 108. As seen in FIG. 1, an input data bus 110 may be configured to provide inputs from the external computing device 106 to the processing element 100, and an output data bus 112 may provide outputs from the processing element 100 to the computing device 106. The computing device 106 may be referred to as a "consumer" in that it consumes the output data generated by the processing element 100. As also seen in FIG. 1, an operand bus 114 provides operands from the processing element 100 to the computation device 108, and an outputs bus 116 provides outputs from the computation device to the processing element. The data busses may or may not include a strobe. The external interface 102 and the computation interface 104 may be understood as the respective control signals, data busses, operands, inputs, outputs, and processing results exchanged between the processing element 100, the external computing device 106 and the computation device 108 attached to the processing element.

In general, the approach to high-speed execution of computer programs described via example embodiments in this disclosure involves processing multiple sets of calculations ("calculation sets"). In accordance with certain embodiments, processing a calculation set may comprise three aspects: 1) loading a set of input values ("inputs") for the calculation set, i.e., to initialize the variables used to carry out the steps of the calculation set (but not calculated by the selected program or algorithm itself); 2) executing a selected computer program, i.e., performing the steps of the calculation set (which are stored as computer-executable instructions on a computer-readable medium); and 3) unloading a set of output values ("outputs") obtained by executing the computer program, i.e., returning the results obtained by carrying out the steps of the calculation set. As described further below, loading the inputs and unloading the outputs may be overlapped with execution of the computer program. In other words, execution of a selected computer program may be carried out in parallel with loading the inputs and unloading the outputs. In this way, net performance of the program execution may be advantageously maximized.

Figure 2:
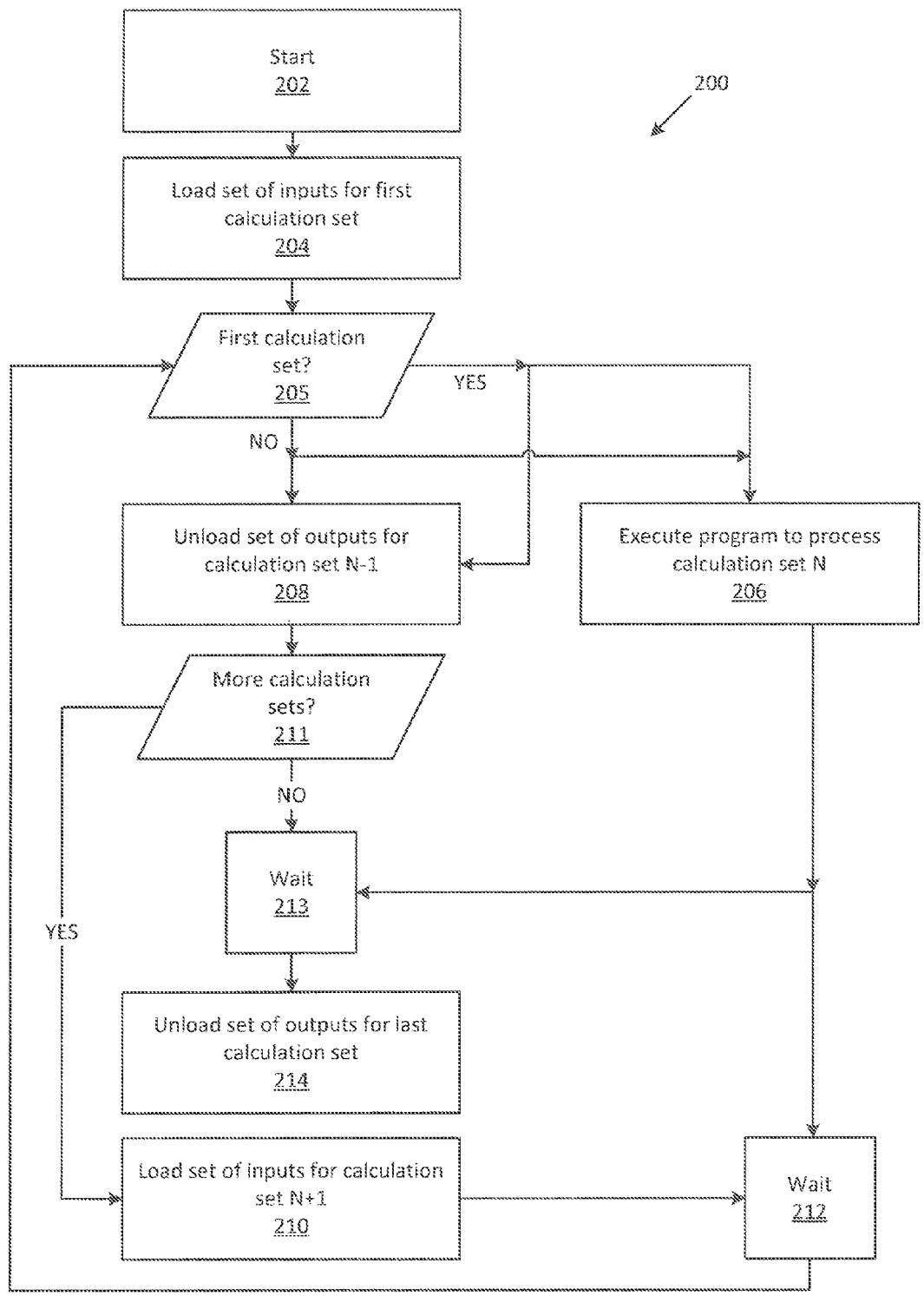
FIG. 2 is a flowchart that may be implemented to process a computer program in accordance with one embodiment of the invention.

Referring to FIG. 2, flowchart 200 shows an example implementation for parallelized computer program execution that may be utilized in accordance with certain embodiments. In general, the approach described below in relation to flowchart 200 parallelizes program execution, loading inputs, and unloading outputs such that—except for the first and last calculation set—a current calculation set is processed in parallel with unloading a set outputs for a previous calculation set and loading a inputs for a subsequent calculation set.

An external computing device, such as device 106, may select a program to execute at a processing element, such as element 100. Upon receipt of a program selection, the program may start (e.g., block 202). The inputs for the first calculation set may be loaded into the processing element (such as shown by block 204). Except for the first calculation set (block 205) and last calculation set, a calculation set N is processed (block 206) in parallel with unloading the outputs for a previous calculation set N−1 (block 208) and loading the inputs for a subsequent calculation set N+1 (block 210). Because the processing, loading, and unloading blocks occur in parallel, the run time is the larger of the time for executing the program (block 206) and the sum of the times for unloading the outputs (block 208) and loading the inputs (block 210). If there are more calculation sets (block 211), the processing element may process the remaining calculation sets until all calculation sets have been processed. The processing element may wait (block 212 and block 213) for the processing, loading, and unloading blocks to complete before continuing. When the last calculation set has been processed, the processing element may unload the outputs for the last calculation set (block 214).

Figure 3:
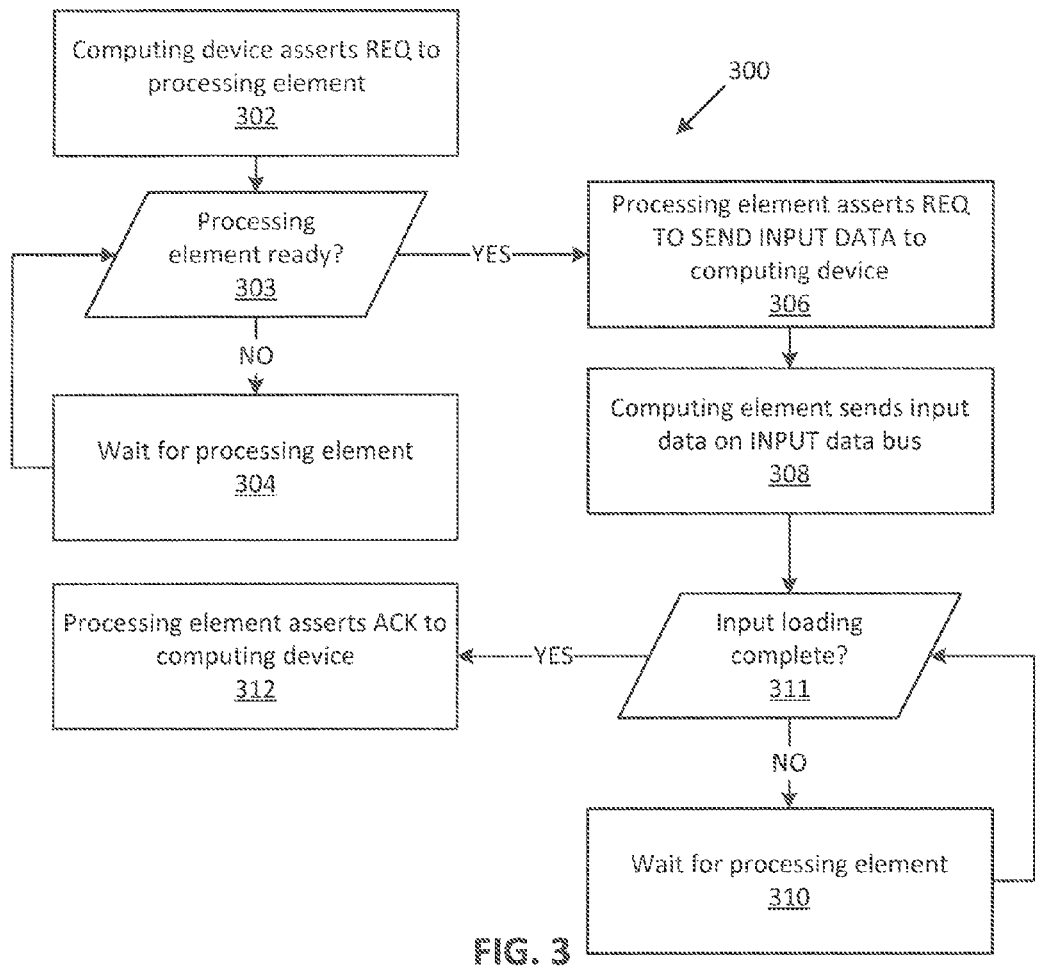
FIG. 3 is a flowchart that may be implemented for loading inputs at a processing element.

In FIG. 3, a flowchart 300 of example implementation for loading inputs for a calculation set is shown. Various control signals may be utilized to facilitate interaction between the processing element and the computing device providing the inputs. The computing device 106 may assert a request signal (REQ) to the processing element that indicates the computing device would like to provide inputs to the processing element (block 302). If the processing element is not ready (e.g., see block 303), then the computing device 106 may wait until the processing element is ready to accept a new inputs (block 304). When the processing element accepts new inputs (block 303), the processing element 100 may assert a request to send signal (REQ TO SENT INPUT DATA) to the computing device (block 306). Upon receipt of REQ TO SEND INPUT DATA, the computing device may begin loading the inputs via the INPUT data bus (block 308). The processing element waits (block 310) for the computing device to finish loading the inputs (block 308). If the computing device has completed loading the inputs (block 311), the processing device may assert an acknowledgement signal (ACK) to the computing device indicating that the inputs were received (block 312).

Figure 4:
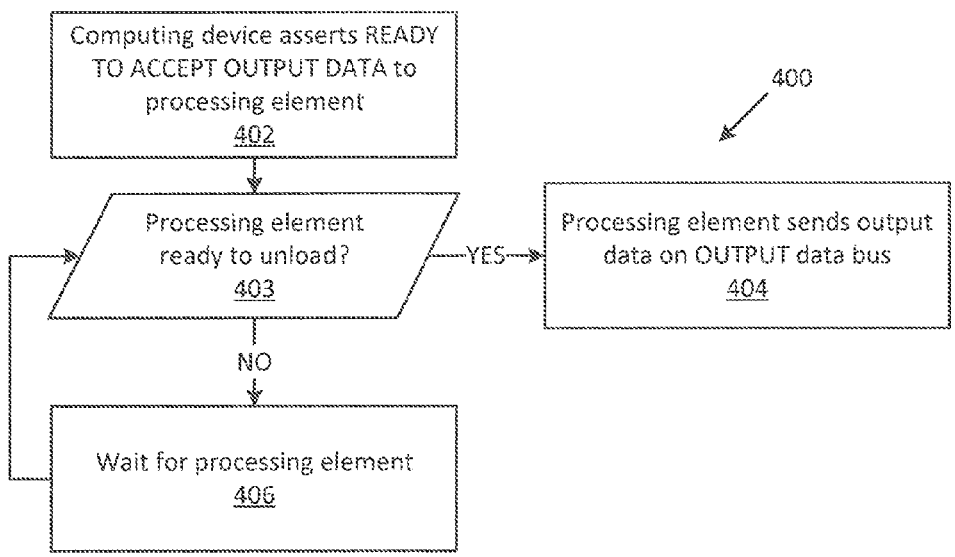
FIG. 4 is a flowchart that may be implemented for unloading outputs at a processing element.

In FIG. 4, a flowchart 400 of an example implementation for unloading outputs for a calculation set is shown. Various control signals may also be utilized to facilitate interaction between the processing element and the computing device receiving the outputs. When the computing device is ready to receive the outputs from the processing element, the computing device may assert a ready signal (READY TO ACCEPT OUTPUT DATA) to the processing element (block 402). If the processing element 100 is ready to unload the outputs (block 403), then the processing element may send the outputs to the computing device on the OUTPUT data bus (block 404). If the processing element is not ready to unload the outputs, then the computing device may wait until the processing element is ready to unload the outputs (block 406). In the illustrated example, the external interface of the processing element manages the handshaking and data transmission involved in loading the inputs and unloading the outputs.

Figure 5:
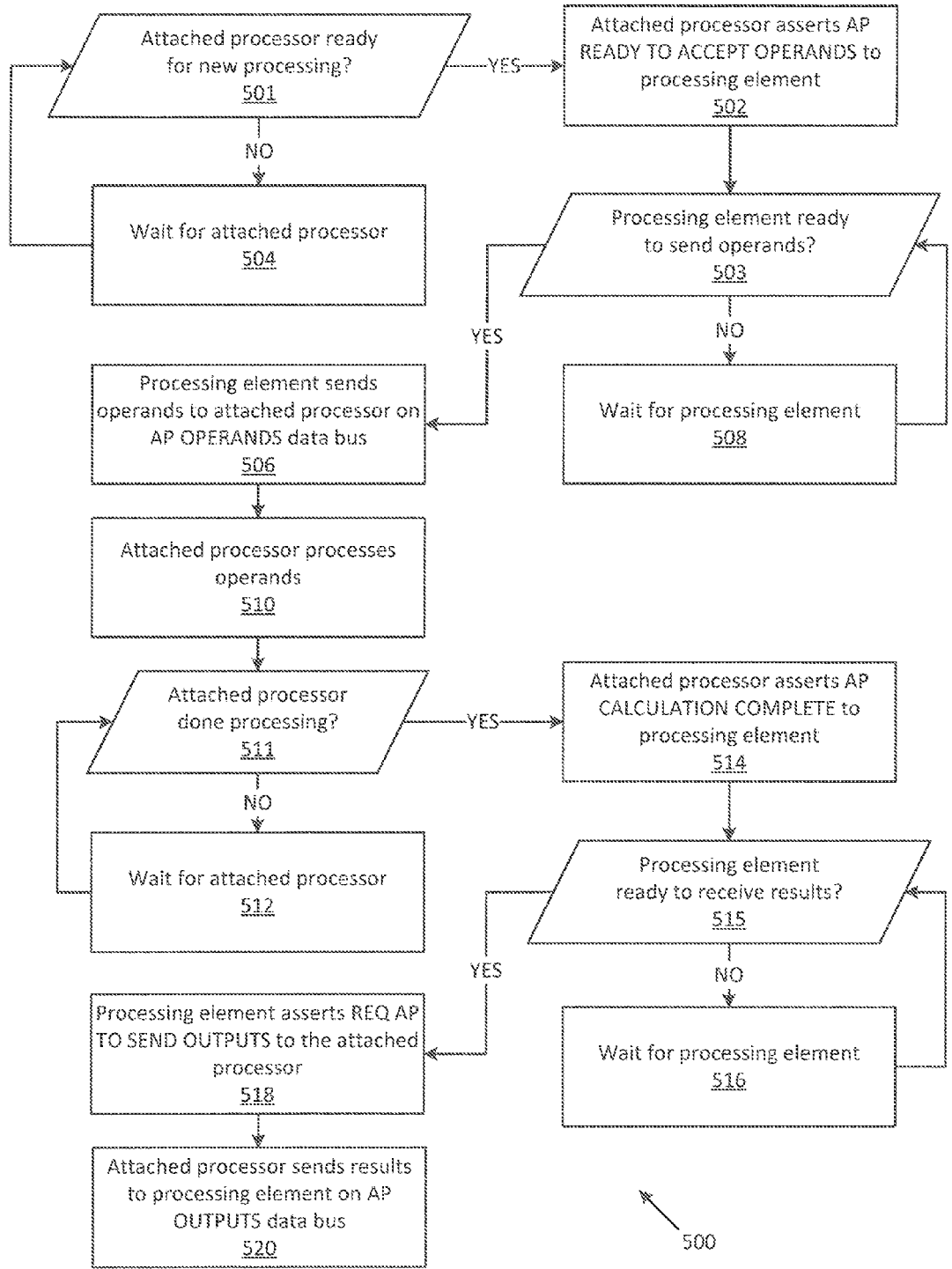
FIG. 5 is a flowchart that may be implemented for processing a current calculation set at a processor attached to a processing element.

In FIG. 5, a flowchart 500 of an example implementation for processing a calculation set is shown. In one embodiment, processing a calculation set involves sending a set of operands ("operands") to the computation device 108 attached to the processing element and receiving the results in response. Various control signals may be utilized to facilitate the interaction between the processing element and the processor attached to the processing element ("attached processor", which may be computation device 108 in certain embodiments). When the attached processor is ready to start new processing (block 501), the attached processor may assert a ready signal (AP READY TO ACCEPT OPERANDS) to the processing element (block 502). This may be transmitted via interface 104 shown in FIG. 1. If the attached processor is not ready to start new processing (block 501), the processing element may wait until the attached processor is ready (block 504). If the processing element is ready to send the operands to the attached processor (block 503), then the processing element may send the operands to the attached processor on the AP OPEARANDS data bus 114 (block 506). If the processing element is not ready to send the operands (block 503), then the attached processor may wait until the processing element becomes ready to send the operands (block 508). Upon receipt of the operands, the attached processor may process the operands (block 510) according to the selected computer program. The processing element continues to calculate. The processing element may wait until the attached processor has completed processing the operands (block 512). If the attached processor has completed processing the operands (block 511), the attached processor may assert a complete signal (AP CALCULATION COMPLETE) to the processing element (block 514). If the processing element is not yet ready to receive the results from the attached processor (block 515), the attached processor may wait until the processing element is ready to receive the results (block 516). When the processing element is ready to receive the results, the processing element may assert a request signal (REQ AP TO SEND OUTPUTS) to the attached process (block 518), and the attached processor may send the processing results (i.e., the outputs) to the processing element on the AP OUTPUTS data bus, such as bus 116 shown in FIG. 1 (see, e.g., block 520). The computation interface of the processing element manages the handshaking and data transmission involved in providing the operands to the attached processor and receiving the outputs from the attached processor.

Figure 6:
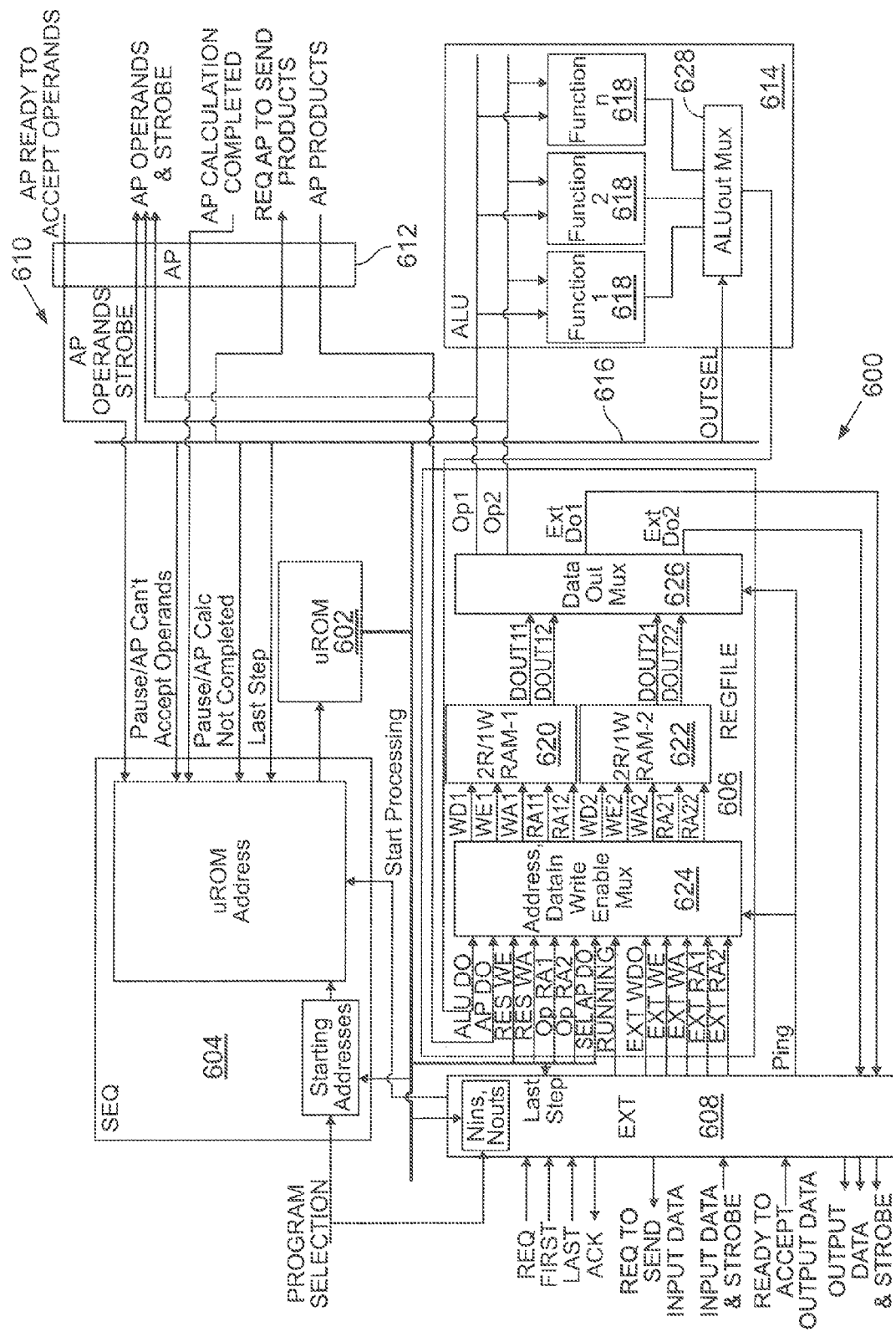
FIG. 6 is a schematic view of an example of an implementation of a processing element.

Referring now to FIG. 6, an example of an implementation of a processing element 600 is shown. As seen in FIG. 6, the processing element 600 may include: a memory module 602 configured to store one or more computer programs; a sequencer 604 (SEQ) configured to selects and controls one of the computer programs stored at the memory module; a register module 606 (REGFILE) configured to store the inputs and outputs respectively associated with subsequent and previous calculation sets as well as sets of intermediate values associated with calculation sets currently being processed; an external interface 608 (EXT) configured to receive inputs from external computing devices and provide outputs to external computing devices; and a computation interface 610 configured to provide operands to one or more computation units 612 and 614. The processing element 600 may also include one or more data busses 616 that interconnect the memory module 602, the sequencer 604, the register module 606, the external interface 608, the computation interface 610 and the computation units 612 and 614. Furthermore, the processing element 600 employs various control signals to control the operation of the memory module 602, sequencer 604, register module 606, and computation units.

The computation units 612 and 614 may be attached to the processing element 600 as shown in FIG. 6. In some example embodiments, the processing element 600 may be described as including the computation units 612 and 614. As noted above, one type of computation unit that may be attached to the processing element is a processor 612, e.g., a central processing unit (CPU), a graphics processing unit (GPU), and so forth. Another type of computation unit that may be attached to the processing element is an arithmetic-logic unit (ALU 614). The ALU 614 may respectively implement multiple functions using one or more calculation units 616. The register module may receive data output from the attached processor 612 (AP DO) as well as data output from the ALU 614 (ALU DO). The attached processor 612 and ALU 614 will be discussed in further detail below.

The memory module 602 may be a memory with a single port. The memory module may be a read-only or a read/write memory. In some example implementations, the memory may be electrically erasable programmable read-only memory (EEPROM). The memory module 602 may be pre-loaded to store one or more computer programs. The computer programs may be written in microcode using an extremely reduced instruction set (xRISC). In this regard, the memory module 602 may be referred to as a microcode read-only memory (uROM). In some example implementations, the uROM 602 may be configured to store up to eight microcode computer programs. Accordingly, the uROM 602 may reserve the last eight words to store the specifics of the microcode computer program. The specifics of a computer program may include, for example, the starting address in the uROM 602 for the first calculation set of the computer program, the number of inputs, and the number of outputs. The computer program output may be a control store word (CSW) that controls the various operations of the processing element 600.

The CSW may be organized into various fields. In this example implementation, the CSW defines fields to control the register module 606, the attached processor 612, the ALU 614, and the sequencer 604. Controls for the register module 606 include a read address for a first operand (OP RA1), a read address for a second operand (OP RA2), a write address for a computation result (RES WA), a write enable flag for the computation result (RES WE), and a data output selector (SEL AP DO) for selecting either the AP DO or the ALU DO for storage at the register module. Controls for the ALU 614 include a calculation result selector (OUTSEL) to select a calculation result from one of the calculation units 618 of the ALU. Controls for the attached processor 612 include a strobe for the operands provided to the attached processor (AP OPERANDS STROBE) and a request for the attached processor to send its output (REQ AP TO SEND OUTPUTS). Controls for the sequencer 604 include a pause signal indicating the attached processor 612 cannot accept new operands (Pause/AP Cannot Accept Operands), a pause signal indicating that the attached processor has not completed processing (Pause/AP Calculation Not Complete), and a last step signal (Last Step) that indicates the last step of the selected computer program.

As noted above, the SEQ 604 selects one of the computer programs stored in the uROM 602 and controls the execution of the selected computer program. SEQ 604 generates the read addresses for the uROM 602 during execution of the computer program. At power up, SEQ 604 reads the reserved locations of the uROM 602 and stores in local registers the starting addresses of the computer programs stored at the uROM. The external interface 608 may provide a start signal (Start Processing) to the SEQ 604. The SEQ 604 may also receive a program selection signal (PROGRAM SELECTION) that indicates which one of the computer programs stored at the uROM 602 should be selected for execution. When SEQ 604 receives the Start Processing signal, the SEQ generates a read address corresponding to the starting address of the selected computer program. The SEQ 604 increments the read address by one after each clock cycle unless the SEQ is paused. There are several conditions that will pause the SEQ 604 such that it does not increment the read address. The SEQ 604 may, for example, pause when: the Pause/AP Cannot Accept Operands field of the CSW is asserted and logical AND the AP READY TO ACCEPT OPERANDS signal is not asserted; the Pause/AP Calculation Not Completed field of the CSW is asserted and logical AND AP CALCULATION COMPLETED is not asserted; and the Last Step field of CSW is asserted.

As also noted above the REGFILE 606 stores a set of intermediate values associated with a calculation set currently being processed, a set of output values associated with a previously processed calculation set, and a set of input values associated with a subsequently processed calculation set. In order to overlap processing the current calculation set, loading the set of inputs, and unloading the set of outputs, the REGFILE 606 includes two memory modules 620 and 622. Each memory module 620 and 622 may be a three-port random access memory (RAM) having two read ports and one write port. Accordingly, the two memory modules 620 and 622 of the REGFILE 606 may be referred to as RAM-1 and RAM-2. Inputs to RAM-1 620 include the data to write (WD1), a write enable signal (WE1), a write address (WA1), a first read address (RA11), and a second read address (RA12). Likewise, inputs to RAM-2 622 include the data to write (WD2), a write enable signal (WE2), a write address (WA2), a first read address (RA21), and a second read address (RA22).

The REGFILE 606 may receive various inputs associated with computing a current calculation set including the RES WE, RES WA, OP RA1, OP RA2, and SEL AP DO. The REGFILE 606 may also receive various inputs associated with the EXT 608 including data to write to the REGFILE (EXT WDO), a write enable signal (EXT WE), a write address (EXT WA), a first read address (EXT RA1) and a second read address (EXT RA2). The inputs associated with the current calculation may be stored in one of the memory modules 620 or 622 of the REGFILE and the inputs associated with the EXT 608 may be stored in a different memory module 620 or 622 of the REGFILE. The REGFILE 606 may also receive a running signal (RUNNING) from the EXT 608 indicating whether the processing element 600 is currently running.

Accordingly, one of the memory modules 620 or 622 of the REGFILE 606 may be associated with the current calculation set while the other memory module 620 or 622 of the REGFILE may be associated with the previous calculation set and the subsequent calculation set. In this regard, one of the memory modules 620 or 622 of the REGFILE 606 may store the intermediate values associated with the current calculation set while the other memory module 620 or 622 of the REGFILE may store the outputs associated with the precious calculation set and the inputs associated with the subsequent calculation set.

The computed results stored in the REGFILE 606 may correspond to either the AP DO from the attached processor 612 or the ALU DO front the ALU 614. The RES WA may specify the address to write the computed results to in RAM-1 620 or RAM-2 622. When SEL AP DO is asserted, the REGFILE stores the computed results from the AP DO at the RES WA in RAM-1 or RAM-2. When SEE AP DO is not asserted, the REGFILE stores the computed results from the ALU DO at the RES WA in RAM-1 or RAM-2. The write enable signals WE1 or WE2 may be derived from the logical AND of the RUNNING signal from the EXT 608 and the RES WE field in the CSW.

When a memory module is associated with the current calculation set, the memory module may be referred to as the RAM-C memory module. When a memory module is associated with the inputs and outputs of the previous and subsequent calculations sets, the memory module may be referred to as the RAM-E memory module. Furthermore, the REGFILE 606 may be configured to have a ping-pong configuration in which RAM-1 620 and RAM-2 622 respectively toggle between being the RAM-C and the RAM-E in response to receipt of a PING signal from the EXT 608. As an example, the REGFILE 606 may be in a first state where RAM-1 620 is the RAM-C and RAM-2 622 is the RAM-E. In response to receipt of a PING signal from the EXT 608, the REGFILE 606 may toggle to a second state where RAM-1 620 is the RAM-E and RAM-2 622 is the RAM-C. Receipt of another PING signal from the EXT 608 may toggle the REGFILE 606 back to the first state.

When the processing element 600 is running, the REGFILE 606 produces two operands (OP1 and OP2), and the REGFILE stores the results computed by one of the computation units 612 or 614. The operand read addresses, OP RA1 and OP RA2, specify the location of the OP1 and OP2 operands stored in the memory modules 620 or 622 of the REGFILE 606. In this regard, the OP1 and OP2 operands may correspond to the contents of RAM-1 620 or RAM-2 622 addressed by OP RA1 and OP RA2. The REGFILE 606 also produces two data outputs (EXT DO1 and EXT DO2) corresponding to the contents of RAM-1 620 or RAM-2 622 addressed by EXT RA1 and EXT RA2. The data outputs EXT DO1 and EXT DO2 may be sent back to the external computing device via the EXT 608.

As noted above, the REGFILE 606 may be configured in a ping-pong configuration. Accordingly, the REGFILE 606, in this example, includes an input multiplexer 624 configured to select one of the memory modules 620 or 622 to store the intermediate values associated with the current calculation set and to select another one of the memory modules 620 or 622 to store the inputs and outputs respectively associated with a subsequent calculation set and a previous calculation set. As an example, when the EXT 608 asserts PING, the input multiplexer 624 sets RAM-1 620 to be RAM-C and RAM-2 622 to be RAM-E, i.e., the input multiplexer respectively associates WD1, WE1, WA1, RA11, and RA12 of RAM-1 with AP DO or ALU DO (depending on SEL AP DO), RES WE logic AND with RUNNING, RES WA, OP RA1, and OP RA2 and respectively associates WD2, WE2, WA2, RA21, and RA22 of RAM-2 with EXT WDO, EXT WE, EXT WA, EXT RA1, and EXT RA2. In this example, when EXT 608 does not assert PING, the input multiplexer 624 sets RAM-1 620 to be RAM-E and RAM-2 622 to be RAM-C, i.e., the input multiplexer respectively associates WD1, WE1, WA1, RA11, and RA12 of RAM-1 with EXT WDO, EXT WE, EXT WA, EXT RA1, and EXT RA2 and respectively associates WD2, WE2, WA2, RA21, and RA22 of RAM-2 with AP DO or ALU DO (depending on SEL AP DO), RES WE logic AND with RUNNING, RES WA, OP RA1, and OP RA2.

The REGFILE 606 also includes an output multiplexer 626 configured to select one of the memory modules 620 or 622 to provide the operands OP1 and OP2 to the computation interface 610 and to select one of the memory modules 620 or 622 to provide the set of outputs EXT DO1 and EXT DO2 to the external interface 608. As an example, when the EXT 608 asserts PING the operands OP1 and OP2 are sourced from the data outputs DOUT11 and DOUT12 of RAM-1 620 and the data outputs EXT DO1 and EXT DO2 are sourced from the data outputs DOUT21 and DOUT22 of RAM-2 622. In this example, when PING is not asserted, the data outputs EXT DO1 and EXT DO2 are sourced from the data outputs DOUT11 and DOUT12 of RAM-1 620 and the operands OP1 and OP2 are sourced from the data outputs DOUT21 and DOUT22 of RAM-2 622.

As noted above, the REGFILE 606 may provide the operands OP1 and OP2 to multiple computation devices, e.g., a processor 612 and an ALU 614. The processor 612 and the ALU 614 may be configured to each provide a computation result at the AP DO and the ALU DO respectively. The processor 612 may be configured to process relatively complex functions such as in-line memory accesses and trigonometric functions while the ALU 614 may be configured to process relatively simple arithmetic and logic functions. Offloading seldom used, relatively complex functions to an attached processor 612 may advantageously help to minimize the footprint of the processing element 600 since one attached processor may support multiple processing elements. Relatively simple arithmetic and logic functions may refer to two-operand functions such as addition, subtraction, multiplication, division, AND, OR, XOR, etc. as well as one-operand functions such as square root, integer-to-floating point conversion, floating point-to-integer conversion, etc. The ALU 614 may process functions requiring more than two operands using the intermediate values obtained during a previous cycle. For example, the ALU 614 may implement the greater than function (MUXGT) using four operands (OP1, OP2, OP3, OP4) where OP3 and OP4 are operands obtained during a previous cycle, the computation result is OP1 when OP3 is greater than OP4, and the computation result is OP2 when OP3 is not greater than OP4. A greater than or equal function (MUXGE) may be implemented in a similar fashion. It will be appreciated that the number and type of calculation units 618 included in the ALU 614 may be selectively customized according to the particular application in which the processing element 600 is used.

The ALU 614 may also include a multiplexer 628 to select one of the calculations units 618 such that the calculation result of the selected calculation unit is the computation result for the ALU. The multiplexer 628 of the ALU 614 may select one of the calculation units 618 based on the OUTSEL signal.

The EXT 608 provides the handshaking for loading the inputs prior to processing a calculation set and unloading the outputs when processing the calculation set is complete. Before processing begins, the inputs may be initialized by writing the inputs to the assigned locations of the RAM-E. The inputs may be assigned a priority to the first locations of the RAM-E that correspond to the number of inputs (NINS). As noted above the uROM 602 stores the NINS in an area reserved for the specifics of the computer program, and the NINS are read into local registers upon power up. An external computing device may assert a REQ when the external computing device is ready to supply a new set of inputs to the processing element 600. When REQ is asserted and EXT 608 is ready to load the inputs, the EXT 608 asserts REQ TO SEND INPUT DATA thereby signaling the processing element 600 that the EXT is ready accept a new set of inputs. If FIRST is also asserted, the EXT 608 asserts PING and clears EXT WA. The external computing device sends the inputs on the INPUT DATA bus. In response to receipt of the inputs on the INPUT DATA bus, the EXT 608 passes the inputs to EXT WDO, asserts EXT WE, and increments EXT WA. After all the inputs have been stored (i.e., NINS inputs) in the RAM-E, the EXT 608 asserts ACK to the external computing device indicating the inputs have been received. The external computing device de-asserts REQ, and the processing element 600 de-asserts ACK.

When processing of a calculation set has completed, the outputs resulting from the processing are unloaded from RAM-E. The EXT 608 provides the outputs to the external computing device. The outputs may be assigned a priority to the last locations of RAM-E that correspond to the number of outputs (NOUTS). Like NINS, the uROM 602 stores NOUTS in an area reserved for the specifics of the computer program, and the NOUTS are read into local registers upon power up. The external computing device may assert READY TO ACCEPT DATA when the external processing device is ready to accept the outputs from the processing element 600. When the processing element 600 is ready to unload the outputs, the EXT 608 sets EXT RA1 to the address of the last word of RAM-E. The EXT 608 sets EXT RA2 to the address of the next-to-last word of RAM-E. The data outputs EXT DO1 and EXT DO2 are the contents of RAM-E corresponding to address EXT RA1 and EXT RA2. The data outputs EXT DO1 and EXT DO2 are passed to the external computing device via the OUTPUT DATA bus. A strobe generated by the EXT may also be provided to the external computing device on the OUTPUT DATA bus. The EXT 608 then decrements by two EXT RA1 and EXT RA2 and repeats the read process repeats until all of the outputs (i.e., NOUTS) are unloaded.

As noted above the uROM 602 stores the sequence of instructions, number of inputs, and number of outputs for a computer program. It will thus be appreciated that, if the number of inputs and outputs remain the same, then modifications to the underlining algorithm can be accomplished by loading the modified computer program to the uROM 602 without impacting other aspects of the processing element 600, the external computing device 106 of FIG. 1, and the attached computation device 108 of FIG. 1. Moreover, by parallelizing program execution, loading inputs, and unloading outputs throughput of the processing element 600 is advantageously increased. Furthermore, an attached processor 612 may be capable of supporting multiple processing elements, thus reducing the overall footprint of a computing implementation having multiple processing elements. The computation interface 610 may be generic in nature such that the base embodiment of a computing system with processing elements can remain fixed while an attached processor 612 can be customized to the based on the algorithm employed. The functions provided by the ALU 614 may also be customized based on the processing algorithm employed advantageously resulting in relatively greater performance and relatively lower power, mass, and volume. Moreover, the approach described in the present disclosure advantageously allows for a relatively faster turnaround when implementing minor changes to an algorithm compared to approaches where each unit of the calculation is implemented in unique hardware. A commercial-off-the-shelf (COTS) field programmable gate array (FPGA) may be used to implement a computing system that implements aspects of the present disclosure.

In particular, embodiments of this disclosure may be utilized within a real-time computing platform, such as for space-borne applications relating to real-time or near real-time image processing. One example application of a computing system that may embody aspects of the present disclosure relate to autonomous landing and hazard avoidance technology (ALHAT), which may be employed, for example, during lunar or planetary landing missions. Three-dimensional (3D) LIDAR technology (Light Detection and Ranging) is one exemplary sensor technology utilized to identify surface features at a landing site. Landing craft may utilize 3D LIDAR to identify surface features of the landing site including hazardous terrain features (e.g., craters, slopes, rocks, etc.), previously deployed assets, and other characteristics of an area surrounding a landing site. During landing, a landing craft may employ 3D Flash LIDAR in a terrain relative navigation (TRN) mode to acquire low-resolution 3D terrain images. The landing craft may also employ flash LIDAR in order to acquire elevation maps utilized during a Hazard Detection Avoidance mode (HAD) and a Hazard Relative Navigation mode (HRN). Doppler LIDAR may also be employed at different phases of a decent phase of a craft approaching a surface. In this regard, different image processing computer-programs may be utilized during different phases of the craft approach and craft landing.

Figure 7:
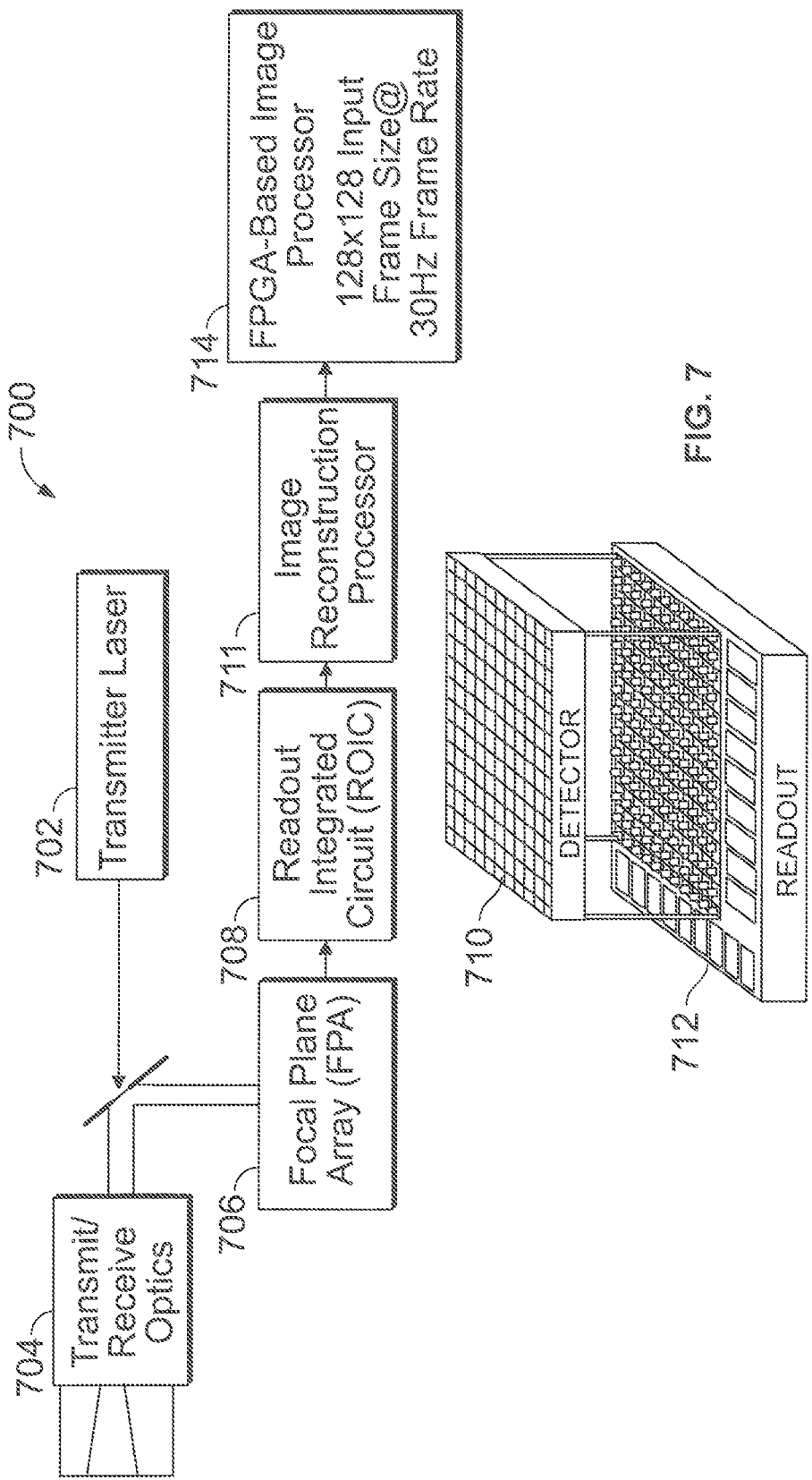
FIG. 7 is an example of an implementation of a 3D Flash LIDAR system that may be utilized in accordance with certain embodiments.

Referring to FIG. 7, example components of a 3D Flash LIDAR system 700 include a transmitter laser 702, transmit/receive optics 704, a focal plane array (FPA) 706, a readout integrated circuit (ROIC) 708 and an image reconstruction processor 710. As seen in FIG. 7, the ROIC 708 includes a detector array 710 integrated with a readout signal processor 712. As one example implementation, system 700 may be employed to obtain relatively low-resolution (e.g., 128×128 pixels) images 714 which may be captured at a relatively low frame rate (e.g., a 30 Hz frame rate). One or more of the above-described embodiments may be employed to process the relatively low-resolution images in order to obtain a relatively high-resolution (e.g., 1024×1024 pixels) image. As one example, the memory module of the processing element may store an image-processing algorithm. In certain embodiments, a first image-processing algorithm may be selected from a plurality of image-processing algorithms. Accordingly, the calculation sets may be sets of image-processing calculations. The set of inputs received from the computing device, such as computing device 106 shown in FIG. 1, may be a set of image-processing inputs received from a LIDAR system (e.g., system 700 of FIG. 7). Likewise, the set of outputs provided to the computing device 106 may be a set of image-processing outputs provided to the LIDAR system.

In particular, the processing element described in this disclosure may be employed in a super-resolution approach whereby the relatively high-resolution image is obtained based on a set of overlapping relatively low-resolution images 714 captured at a 30 Hz frame rate. In this way, the super-resolution approach advantageously generates an image having a higher spatial resolution than the size of the pixel array at the recording device. It will be appreciated that this approach may be employed in additional or alternative applications where real-time or near real-time image processing may be desired, i.e., applications other than those related to sampling terrestrial or extraterrestrial terrains.

Additional or alternative applications may include guidance, navigation, and control systems. As an example, the disclosure provided in this description may be employed to assist craft to dock with one another, in which case "terrain" may refer to a space dock. In other applications, the present disclosures may be employed to assist robotic arms to locate specific features on a device, e.g., where a robot is required to locate or manipulate a bolt or some other object to manipulate in accordance with the robotic programming. In this regard, it will be appreciated that the term "vehicle" may also refer to a robot, robotic arm, or other element, device, apparatus, or system where guidance and control vis-à-vis the present disclosure may be advantageously achieved.

What is claimed is:

1. A processing device for high-speed execution of a computer program comprising:
   a memory module configured to store one or more computer programs;
   a sequencer configured to select one of the computer programs and control execution of the selected computer program;
   a register module including a first memory module and a second memory module configured to store a set of intermediate values associated with a current calculation set, a set of output values associated with a previous calculation set, and a set of input values associated with a subsequent calculation set, wherein the register module is configured to toggle between the first state and the second state such that in the first state the first memory module stores the set of intermediate values associated with the current calculation set and the second memory module stores the set of input values associated with the subsequent calculation set and the set of output values associated with the previous calculation set and in the second state the second memory module stores the set of intermediate values associated with the current calculation set and the first memory module stores the set of input values associated with the subsequent calculation set and the set of output values associated with the previous calculation set;
   an external interface configured to receive the set of input values associated with the subsequent calculation set from a computing device and to provide the set of output values associated with the previous calculation set to the computing device;
   a computation interface configured to provide a set of operands for computation during processing of the current calculation set; and
   wherein the processing device is configured such that the set of input values associated with the subsequent calculation set are loaded into the register module and the set of output values associated with the previous calculation set are unloaded from the register module in parallel with processing of the current calculation set.

2. The processing device of claim 1, further comprising:
   at least one computation device attached to the computation interface and configured to receive the set of operands provided by the computation interface, to generate a computation result based on the set of operands, and to provide the computation result to the register module; and
   wherein the register module is further configured to store the computation result as one of the intermediate values of the set of intermediate values associated with the current calculation set.

3. The processing device of claim 2, wherein:
   the at least one computation device includes a first computation device configured to provide a first computation result and a second computation device configured to provide a second computation result; and
   either the first computation result or the second computation result is selected as the computation result stored at the register module as one of the intermediate values associated with the current calculation set.

4. The processing device of claim 3, wherein:
   the first computation device is a processor configured to perform in-line memory access and one or more trigonometric functions; and
   the second computation device is an arithmetic-logic unit that includes a plurality of calculation units that operate on the set of operands in parallel.

5. The processing device of claim 4, wherein:
   the arithmetic-logic unit further includes a multiplexer configured to select one of the calculation units; and
   the second computation result provided by the arithmetic-logic unit is a calculation result generated by the calculation unit selected by the multiplexer.

6. The processing device of claim 1,
   wherein each of the first memory module and the second memory module is a random access memory module having two read ports and one write port;
   wherein the register module is configured to toggle between the first state and the second state based on a control signal received from the external interface.

7. The processing device of claim 6, wherein the register module further includes:
   an input multiplexer configured to select one of the memory modules to store the set of intermediate values associated with the current calculation set and to select one of the memory modules to store the set of input values associated with the subsequent calculation set and the set of output values associated with the previous calculation set; and
   an output multiplexer configured to select one of the memory modules to provide the set of operands to the computation interlace and to select one of the memory modules to provide the set of outputs to the external interface.

8. The processing device of claim 1, wherein the memory module is further configured to store a starting address for each of the computer programs, a number of inputs to each of the computer programs, and a number of outputs from each of the computer programs.

9. A method for high-speed execution of a computer program comprising:
   selecting at a processing device a computer program to execute;
   processing a current calculation set at at least one computation device attached to the processing device;
   loading a set of input values associated with a subsequent calculation set into a register module of the processing device;
   unloading a set of output values associated with a previous calculation set from the register module;
   storing a set of intermediate values associated with the current calculation set in the register module;
   toggling the register module between a first state and a second state such that in the first state a first memory module stores the set of intermediate values associated with the current calculation set and the second memory module stores the set of input values associated with the subsequent calculation set and the set of output values associated with the previous calculation set and in the second state the second memory module stores the set of intermediate values associated with the current calculation set and the first memory module stores the set of input values associated with the subsequent calculation set and the set of output values associated with the previous calculation set; and wherein processing the current calculation set, loading the set of input values associated with the subsequent calculation set, and unloading the set of output values associated with the previous calculation set are performed in parallel.

10. The method of claim 9, further comprising:

selecting, using an input multiplexer, the first memory module or the second memory module at the register module to store the set of intermediate values associated with the current calculation set; and selecting, using the input multiplexer, a different one of the first memory module or the second memory module at the register module to store the set of input values associated with the subsequent calculation set and the set of output values associated with the previous calculation set.

11. The method of claim 10, further comprising:

selecting, using an output multiplexer, the first memory module or the second memory module that stores the set of intermediate values associated with the current calculation set to provide a set of operands at a computation interface during processing of the current calculation; and selecting, using the output multiplexer, the different memory module that stores the set output values associated with the previous calculation set to provide the set of output values associated with the previous calculation set at an external interface when unloading the set of output values associated with the previous calculation set.

12. The method of claim 11, further comprising:

toggling the register module between the first state and the second state based on a control signal received at the register module from the external interface.

13. The method of claim 9, wherein the at least one computation device includes a first computation device and a second computation device and further comprising:

providing a set of operands to the first computation device such that the first computation device generates a first computation result based on the set of operands during processing of the current calculation set;

providing the set of operands to the second computation device such that the second computation device generates a second computation result based on the set of operands during processing of the current calculation set;

selecting either the first computation result or the second computation result for storage at the register module; and storing the computation result that is selected at the register module as an intermediate value of the set of intermediate values associated with the current calculation set.

14. The method of claim 13, wherein:

the first computation device is a processor configured to perform in-line memory access and one or more trigonometric functions; and the second computation device is an arithmetic-logic unit that includes a plurality of calculation units that operate on the set of operands in parallel.

15. The method of claim 14, further comprising selecting, using a multiplexer, one of the calculations units such that a calculation result generated by the calculation unit selected by the multiplexer is the second computation result provided by the arithmetic-logic unit.

16. A apparatus for high-speed execution of an image-processing program comprising:

a memory module configured to store the image-processing program;

a sequencer configured to control execution of the image-processing program;

a register module including a first memory module and a second memory module configured to store a set of intermediate values associated with a current set of image-processing calculations, a set of image-processing outputs associated with a previous set of image-processing calculations, and a set of image-processing inputs associated with a subsequent set of image-processing calculations, wherein the register module is configured to toggle between the first state and the second state such that in the first state the first memory module stores the set of intermediate values associated with the current set of image-processing calculations and the second memory module stores the set of image-processing inputs associated with the subsequent set of image-processing calculations and the set of image-processing outputs associated with the previous set of image-processing calculations and in the second state the second memory module stores the set of intermediate values associated with the current set of image-processing calculations and the first memory module stores the set of image-processing inputs associated with the subsequent set of image-processing calculations and the set of image-processing outputs associated with the previous set of image-processing calculations;

an external interface configured to receive the set image-processing inputs from a light detection and ranging (LIDAR) system and provide the set of image-processing outputs associated with the previous set of image-processing calculations to the LIDAR system;

a computation interface configured to provide a set of operands for computation during processing of the current set of image-processing calculations;

a processor attached to the computation interface that operates on the set of operands to provide a computation result for the current set of image-processing calculations; and wherein the register module loads the set of image-processing inputs associated with the subsequent set of image-processing calculations and unloads the set of image-processing outputs associated with the previous set of image-processing calculations in parallel with processing of the current set of image-processing calculations at the processor.

17. The apparatus of claim 16, wherein the computation result provided by the processor is a first computation result and further comprising:

an arithmetic-logic unit attached to the computation interface that operates on the set of operands to provide a second computation result; and wherein either the first computation result or the second computation result is selected for storage at the register module as one of intermediate values associated with the current set of image-processing calculations.

18. The apparatus of claim 17, wherein:

the processor is configured to perform in-line memory access and one or more trigonometric functions;

the arithmetic-logic unit includes a plurality of calculation units that operate on the set of operands in parallel; and the arithmetic-logic unit selects one of the calculation units such that a calculation result generated by the calculation unit selected by the multiplexer is the second computation provided by the arithmetic-logic unit.

19. The apparatus of claim 16, wherein the register module is configured to toggle between the first state and the second state based on a control signal received from the external interface.

20. The apparatus of claim 19, wherein the register module further includes:
- an input multiplexer configured to select one of the memory modules to store the set of intermediate values associated with the current set of image-processing calculations and to select one of the memory modules to store the set of image-processing inputs associated with the subsequent set of image-processing calculations and the set of image processing outputs associated with the previous set of image-processing calculations; and
- an output multiplexer configured to select one of the memory modules to provide the set of operands to the processor and to select one of the memory modules to provide the set of image-processing outputs associated with the previous set of image-processing calculations to the external interface for transmission to the LIDAR system.

* * * * *